United States Patent [19]

Davies

[11] Patent Number: 4,917,782
[45] Date of Patent: Apr. 17, 1990

[54] ELECTROLYTIC LIQUID PURIFICATION PROCESS AND APPARATUS

[75] Inventor: Bruce Davies, Kenmore, Wash.

[73] Assignees: Advanced Water Systems, Inc., Woodinville; Water Regeneration Systems, Inc., Kirkland, both of Wash.

[21] Appl. No.: 163,501

[22] Filed: Mar. 2, 1988

[51] Int. Cl.[4] .......................... C02F 1/46; C25B 15/08; C25B 9/00; B01D 13/02

[52] U.S. Cl. ................................. 204/152; 204/188; 204/229; 204/240; 204/276; 204/269; 204/306; 210/748

[58] Field of Search ................ 204/269, 270, 275–276, 204/229, 240, 130, 131, 136, 152, 306, 188; 210/748

[56] References Cited

U.S. PATENT DOCUMENTS

| | | | |
|---|---|---|---|
| 2,864,750 | 12/1958 | Hughes, Jr. et al. | 204/275 X |
| 3,523,891 | 8/1970 | Mehl | 204/269 |
| 3,679,556 | 7/1972 | Doevenspeck | 204/269 |
| 3,728,245 | 4/1973 | Preis et al. | 204/275 |
| 3,835,018 | 9/1974 | Casanovas et al. | 204/228 |
| 3,865,710 | 2/1975 | Phipps | 204/276 X |
| 3,925,176 | 12/1975 | Okert | 204/152 |
| 4,419,206 | 12/1983 | Frame | 204/149 X |
| 4,425,216 | 1/1984 | Neymeyer | 204/270 |
| 4,436,601 | 3/1984 | Branchick et al. | 204/149 |
| 4,572,775 | 2/1986 | Paniagua | 204/276 X |
| 4,623,436 | 11/1986 | Umehara | 204/149 |

Primary Examiner—Donald R. Valentine
Attorney, Agent, or Firm—Christensen, O'Connor, Johnson & Kindness

[57] ABSTRACT

Liquid is clarified by passing it between spaced plates of a stack including two interleaved sets of plates, one set being connected to one direct current lead and the other set being connected to the other direct current lead. The liquid may flow through the spaces between the plates in a single direction in parallel paths or may flow in a serpentine path. Impurities removed from the liquid adhere to the plates and may be purged from the plates periodically by reversing the direction of flow of current between the plates. Impurities sloughed off the plates are trapped in a filter in the cell outlet.

4 Claims, 11 Drawing Sheets

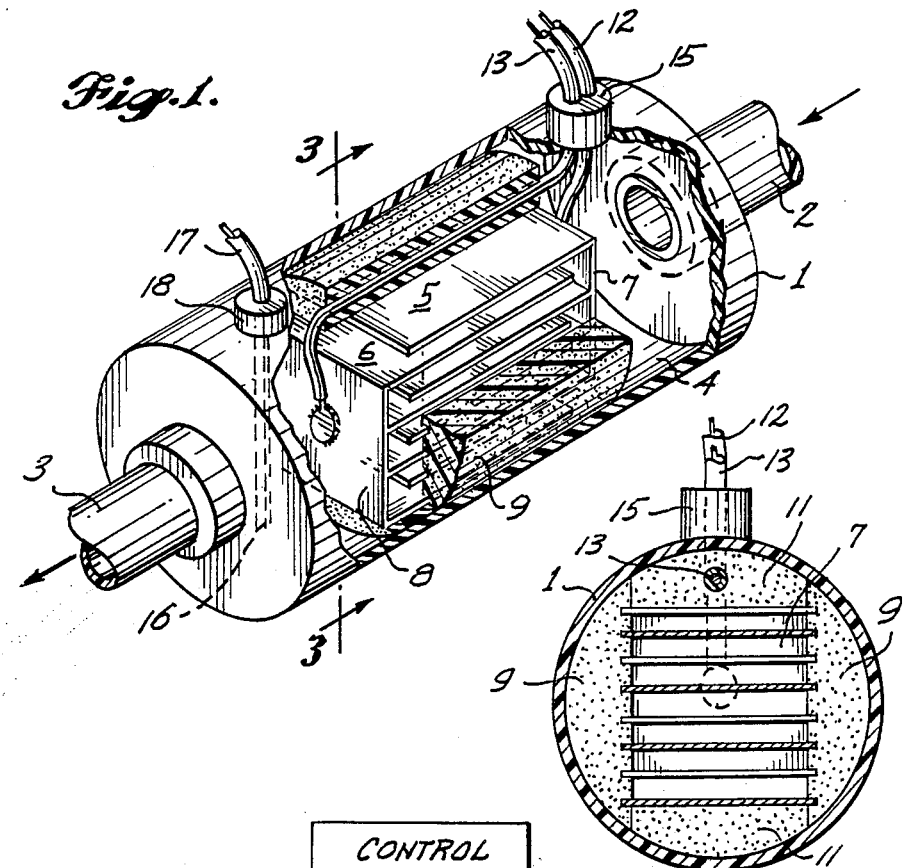
Fig. 1.
Fig. 3.
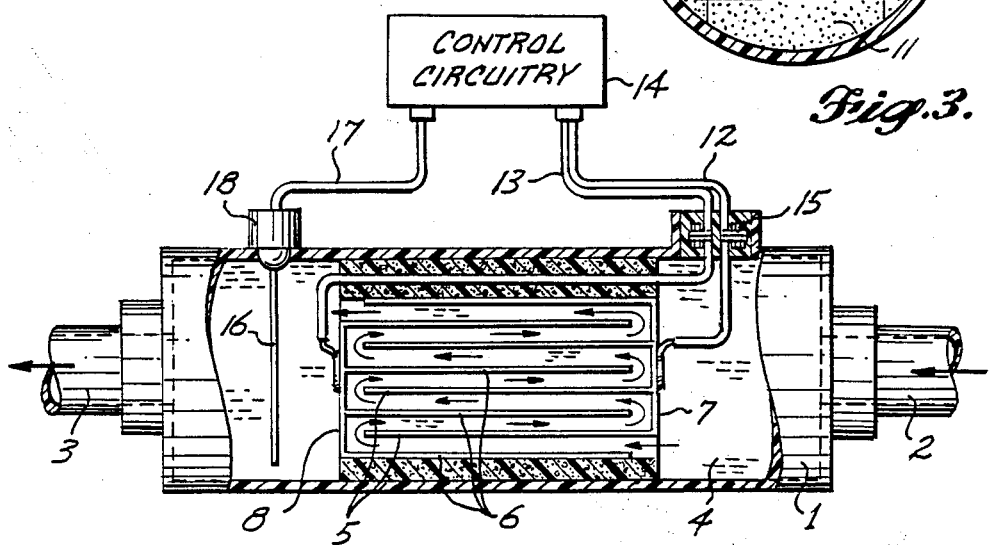
Fig. 2.

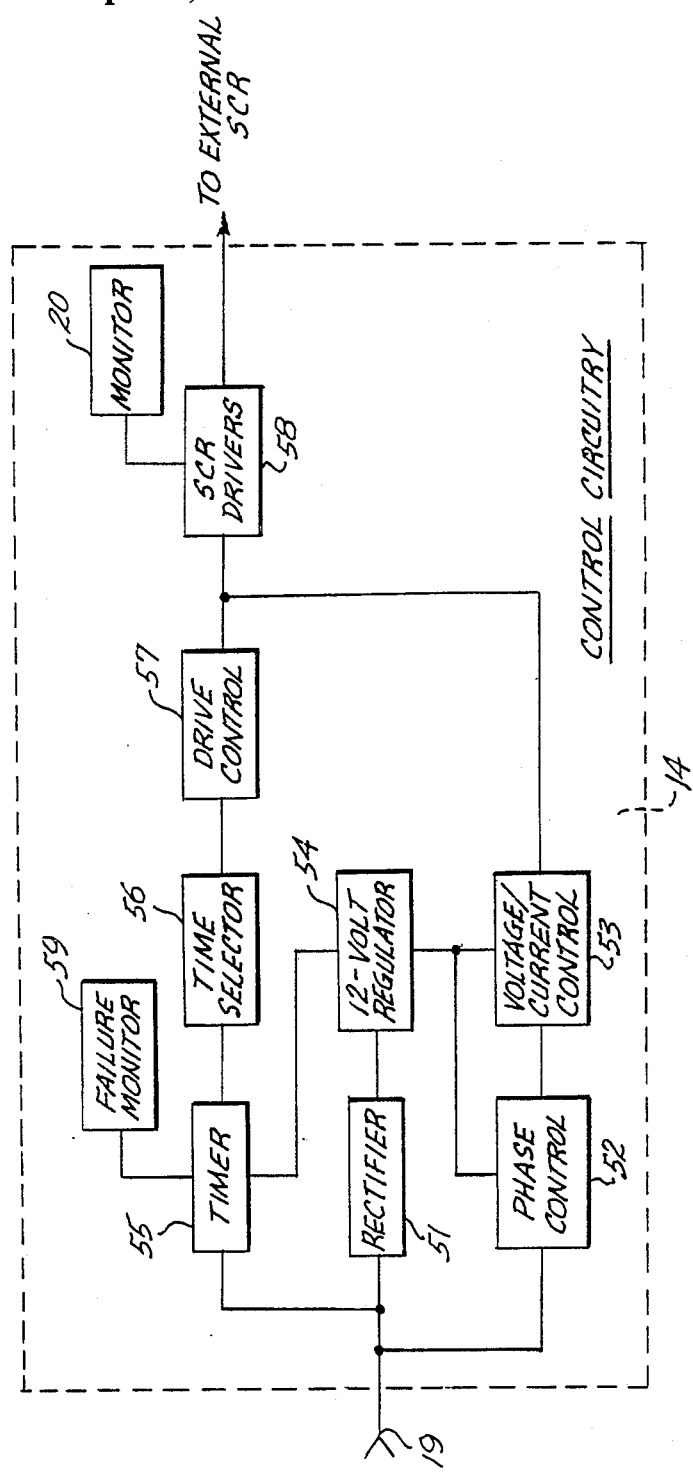

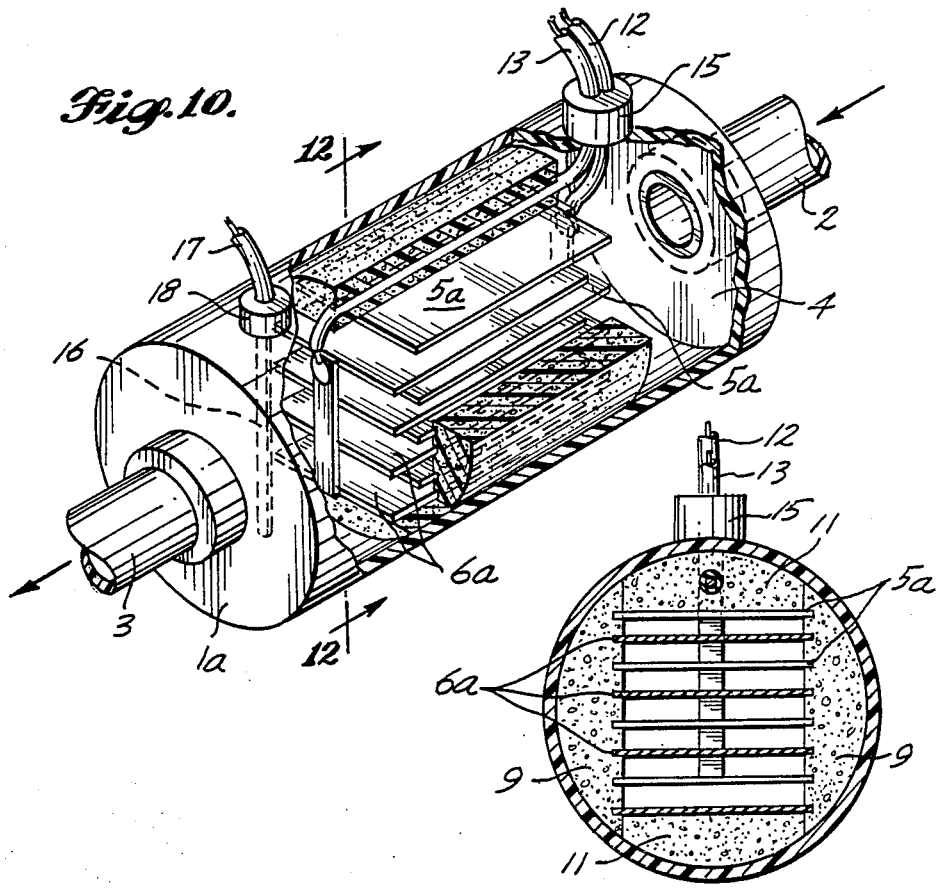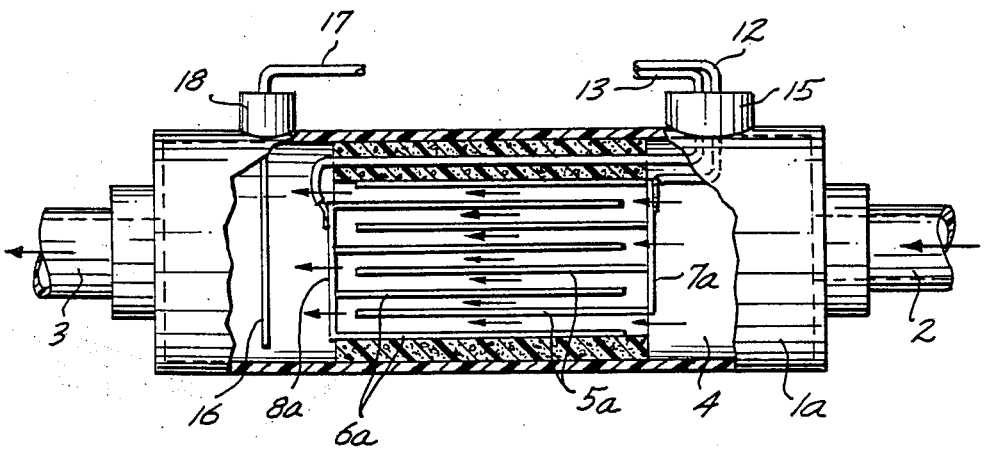

ELECTROLYTIC LIQUID PURIFICATION PROCESS AND APPARATUS

BACKGROUND OF THE INVENTION

1. Field of the Invention

The present invention relates to a process and apparatus for electrolytically treating water and other liquids and particular for treating water to be used for drinking purposes or for human body contact.

2. Prior Art

The electrolytic disinfection of waste water or contaminated water is disclosed in U.S. Ochert Pat. No. 3,925,176 issued Dec. 9, 1975 for Apparatus and Method for Electrolytic Sewage Treatment which utilizes an electric cell through which the water flows in a serpentine path between the inlet and outlet ends of the cell.

In addition, Casanovas U.S. Pat. No. 3,835,018 issued Sept. 10, 1974 for Apparatus for the Treatment by Metallic Ions of Aqueous Liquids shows a vat provided with electrodes through which liquid is circulated.

SUMMARY OF THE INVENTION

A principal object of the invention is to remove from liquid impurities that cannot be effectively filtered out such as by a strainer, a filter cloth or paper filter or an activated charcoal filter.

Another object is to provide a process and apparatus which will remove from liquid impurities of different types such as chemical impurities, including chlorine, metals and alkaline material, which will also kill and remove minute biological material such as algae and microbes, and which will tend to render the ph of the liquid approximately neutral.

A further object of the invention is to provide a process which will be effective quite quickly so that it can purify liquid during a single pass through the apparatus but which process can also be used for processing portions of a body of liquid such as in an aquarium, a swimming pool or a hot tub.

Another object is to provide apparatus for effecting a liquid purification process which is simple and compact while being effective.

A specific object is to provide a water purification process and apparatus that will remove residual impurities from water after normal water treatment, such as chlorine, hardening impurities, such as alkaline material, and biological impurities such as algae and microbes, including bacteria.

It is also an object to provide apparatus for performing the clarifying process which is simple, compact, reliable and inexpensive to operate.

A further specific object is to utilize the clarifying process and apparatus for removing impurities from cutting fluid such as soluble oil used in machining operations for lubrication and cooling.

The foregoing objects can be accomplished by utilization of a clarifying electrolytic cell in conjunction with a filter and appropriate control and timing mechanism for controlling the operation of the electrolytic cell in conjunction with suitable pressure or pumping equipment to pass the liquid through the apparatus.

BRIEF DESCRIPTION OF THE DRAWINGS

FIG. 1 is a top perspective of a clarifying electrolytic cell utilized in the apparatus of this invention with parts broken away. FIG. 2 is a side elevation of the cell with parts broken away. FIG. 3 is a transverse section through the cell taken on line 3—3 of FIG. 1.

FIG. 9 is a diagram illustrating control and timing mechanism for the apparatus.

FIG. 10 is a top perspective of an alternate type of clarifying electrolytic cell with parts broken away. FIG. 11 is a side elevation of such alternate type of electrolytic cell with parts broken away and FIG. 12 is a transverse section through such alternate type of electrolytic cell taken on line 12—12 of FIG. 10.

DETAILED DESCRIPTION

Figure 4:
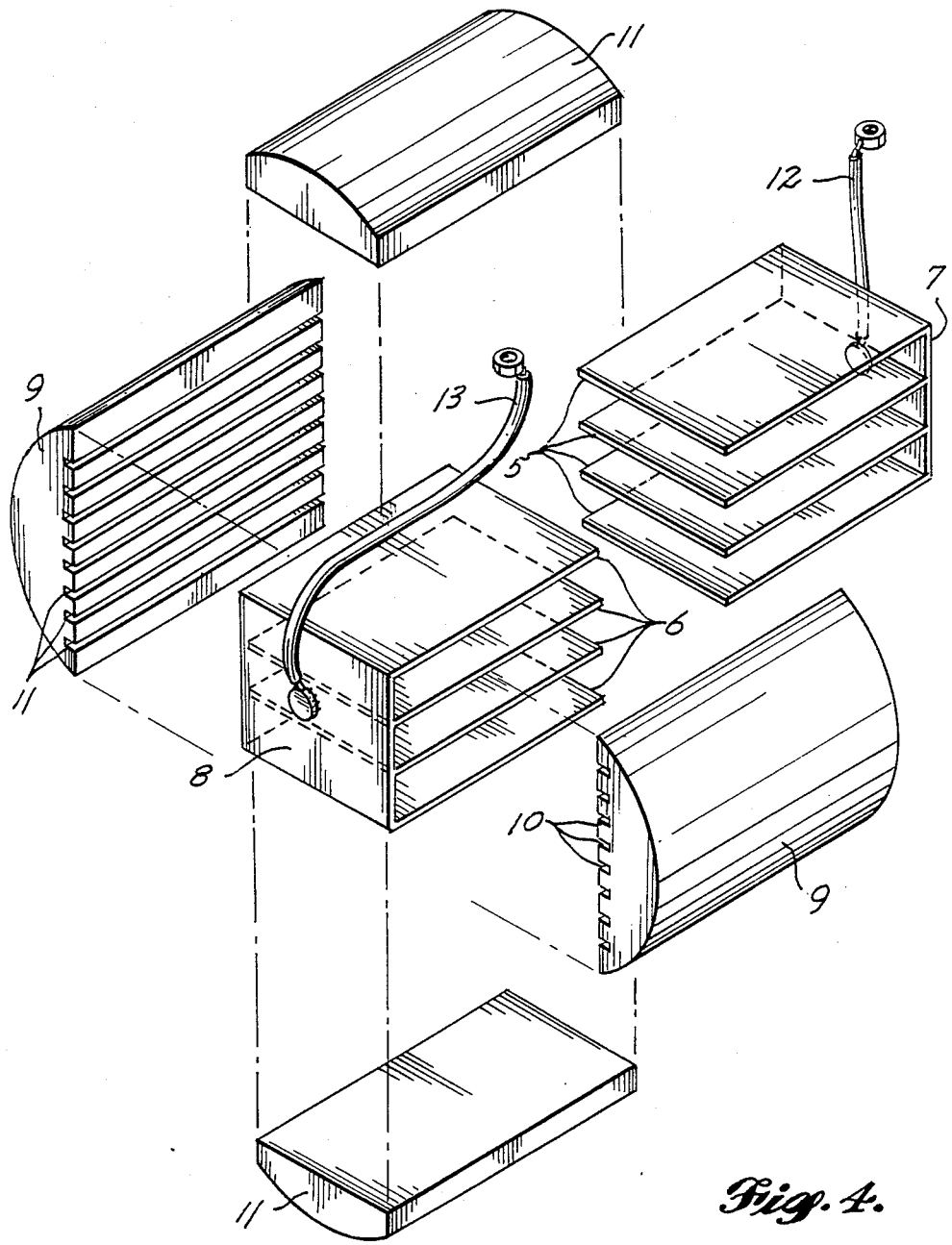
FIG. 4 is a top perspective of internal components of the cell shown in exploded relationship.

The process and apparatus of the present invention is not intended primarily for use in treating badly polluted water, or for treating large quantities of water such as in connection with a municipal water supply system or sewage treatment plant. On the contrary, such apparatus is intended for use in finish clarification of water or other liquid by an end user of such water or liquid. Consequently the apparatus for performing the process of the invention ordinarily does not have large capacity and can be quite compact and even provided in the form of a portable unit that can be used temporarily in a particular installation.

The heart of the clarifying apparatus is the clarifying electrolytic cell such as that shown in FIGS. 1 to 4. Such cell is shown as including a cylindrical casing 1 on one end of which a liquid supply pipe 2 is connected and a liquid discharge pipe 3 is connected to the other end of the casing. In the interior chamber 4 of the casing is lodged a stack of electrode plates including two components or plate sets disposed in interstratified or interleaved relationship. Thus in FIGS. 1 to 4, inclusive, grouped anode plates 5 and grouped cathode plates 6 are shown in interleaved relationship. The anode plates 5 project in parallel, equally-spaced, cantilever fashion from an end connecting plate 7. The cathode plates 6 project in parallel, equally-spaced, cantilever fashion from an end connecting plate 8.

The opposite edges of the plates in the stack are held by mounting blocks 9 located at opposite sides of the stack. The outer sides of such blocks are cylindrically convex to fit tightly against the inner wall of the cell casing 1 and the inner chordal faces of the blocks have equally spaced parallel grooves 10 extending lengthwise of the cell for receiving the opposite edges respectively of the plates 5 and 6 to hold the plates firmly in accurately spaced relationship.

The ends of the mounting blocks 9 fit against the end plates 7 and 8 respectively to close the sides of the channels between the plates of the stack. The edges of the mounting blocks 9 extend above the top and below the bottom of the stack of plates as shown in FIG. 3. The spaces above the stack of plates and below the stack of plates are closed by filler blocks 11 having outer cylindrically convex sides to fit snugly the inside of the cylindrical cell casing 1 and inner flat sides to fit contiguously against the upper and lower plates of the stack respectively.

The anode plates 5 and cathode plates 6 are interleaved with the free end of each cantilever plate spaced from the adjacent end plate a distance approximately equal to the spacing between adjacent plates of the stack so as to form within the stack a series of return bends between adjacent interplate spaces providing a sinuous passage from the entrance end of the casing to the exit end of the casing through the plate stack. The mounting blocks 9 and filler blocks 11 are made of material impermeable to liquid, such as closed cell foamed plastic material, which serves as a barrier to flow of liquid from the entrance end of the casing to the exit end of the casing other than through the sinuous passage between the interleaved plates and mounting blocks 9.

The capacity of the cell for flow of liquid through it will depend upon the width of the plates 5 and 6 in the stack, the space between adjacent plates and the space between each plate free end and the adjacent end connecting plate. For most purposes the plate width should be in the range of 3 to 5 inches (7.62 to 12.7 cm) and the spacing between adjacent plates should be one-eighth to one-quarter of an inch (3.5 to 7 mm). It is desirable for the space between adjacent plates to be small so as to provide a short path for travel of electricity between the plates. The time during which the liquid is subjected to the electric field between the anode and cathode plates can be regulated by selection of the length of the path between the liquid and the plates which is determined by the length of the plates, and by the velocity of the liquid flowing through the interplate passage. Preferably the length of the plates 5 and 6 is in the range of 5 inches to 10 inches (12.7 to 25.4 cm) and the velocity of the water may be 8 to 20 feet (2.4 to 6 m) per minute so that the water will be in contact with the plates for a period of 15 to 40 seconds.

The clarification of the liquid is accomplished by the transmission of electricity between the anode and cathode plates and the electric field which such transmission produces without the plates adding any material to the liquid. For that reason it is desirable for the plates to be made of inert material such as having a substrate of titanium coated with ruthenium oxide ($RuO_4$).

The clarifying electrolytic cell shown in FIGS. 1, 2, 3 and 4 has a long path of travel for the liquid between the electrode plates for the size of the cell, the stack of plates shown in FIG. 2 providing seven passes lengthwise through the plate stack because of the utilization of return bends forming the sinuous path.

An electric wire 12 connected to the end connector plate 7 of the set of anode plates 5 and a wire 13 connected to the end connecting plate 8 of the set of cathode plates 6 are connected to control electronics circuitry 14 for controlling the operation and timing of the electrolytic cell. The wires 12 and 13 pass through a gland 5 containing a bolted connection mounted on the wall of the cell.

To render the cell inoperative in the event that flow of liquid through the cell ceases or drops below a minimum selected flow rate, a flow-sensitive probe 16 is mounted in the cell in the path of liquid flow. Such probe is mounted from the wall of the cell by a magnetic flow switch 18 connected by a wire 17 to the control circuitry 14. Such switch is normally in off position and deflectable to cell-energizing switch-closing position by pressure against the probe of liquid flowing through the cell.

Figure 5:
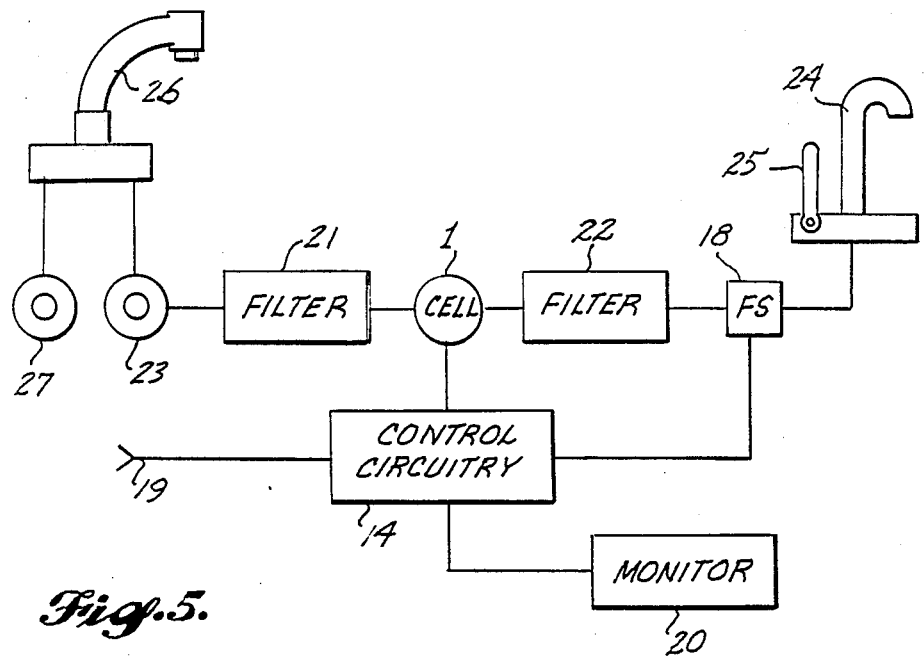
FIG. 5 is a diagram showing various components of the apparatus used in conjunction with a domestic plumbing fixture such as a kitchen sink or a wash basin.

Because of the long sinuous flow path through the cell casing 1, such cell is well suited for use in apparatus through which water passes only once from a supply to a discharge for use. Such an installation is shown in FIG. 5 in which the electronic control mechanism for the cell is powered by a source of electricity 19 which conveniently may be a 110 volt or a 220 volt alternating current source. A monitor 20 is connected to the control circuitry 14 to indicate the functioning of the system. Such monitor may, for example, include three lights, one being a red light, illumination of which would indicate some malfunction of the system; a yellow light, illumination of which would provide a warning that some component of the system may have difficulty soon; and a green light, illumination of which would indicate that the system is in proper operation. Approaching difficulty may be near clogging of a filter.

In order to reduce the burden on the clarifying electrolytic cell for purification of liquid flowing through it, it is desirable to provide a filter 21 ahead of the entrance to the cell which may be an absorbent paper cartridge to remove particles from the liquid before it reaches the cell. In operation impurities such as chemicals and biological matter will migrate to the plates of one set, usually the anode plates 5, to which most of the impurities would adhere, but some of the impurities may be swept along with the current of liquid out of the cell in which event they would be trapped in a cell outlet filter 22 preferably of the activated charcoal type. Such filter would also absorb liberated chlorine which is frequently present in treated domestic water, or chlorine produced by electrolysis of sodium chloride salt dissolved in the water.

In addition to preserve the clarifying action of the cell the direction of current flow through the wires 12 and 13 should be reversed periodically, such as every 10 to 30 hours, for a short time, such as 15 to 60 minutes, to release and purge from the cell plates impurities that have accumulated on them. Such impurities sloughed off the plates will be carried by the flowing liquid out of the cell but will be trapped in the charcoal filter 22 and thus prevented from being discharged from the clarifying apparatus.

The clarifying apparatus can be installed in a household water system by connecting the entering filter 21 to the cold water supply 23 for a sink or a wash bowl, for example. The apparatus will have its own discharge faucet 24 controlled by a valve operated by handle 25. Such installation of the apparatus preferably does not interfere with the usual connection of the cold water supply source to the faucet 26, which may be a mixing type of faucet also connected to a hot water supply source 27. Thus, water of desired temperature may be obtained from the faucet 26 for dishwashing purposes while water finally clarified by the apparatus described above can be obtained from the outlet 24 for drinking and cooking purposes.

Figure 6:
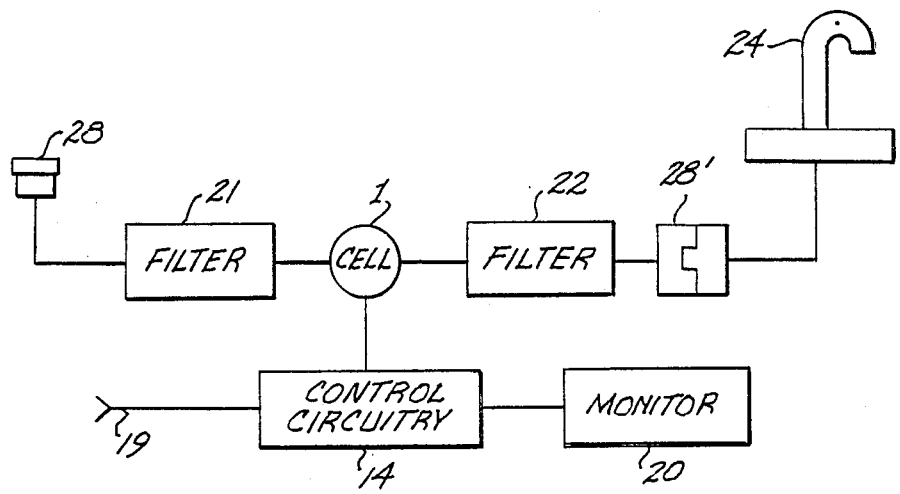
FIG. 6 is a diagram of portable apparatus that can be attached to a discharge faucet of a plumbing fixture.

The apparatus described above can be sufficiently compact as to be readily portable for temporary installations and such apparatus is shown in FIG. 6. This apparatus is the same as described in connection with FIG. 5 except that the filter 21 can be connected to a water supply source by a sleeve coupling 28 that can simply be slid over the discharge end of a cold water supply faucet. To facilitate packing of the apparatus the discharge faucet 24 can be detachably connected to the clarifying apparatus by a quickly disconnectible coupling 28'.

Figure 7:
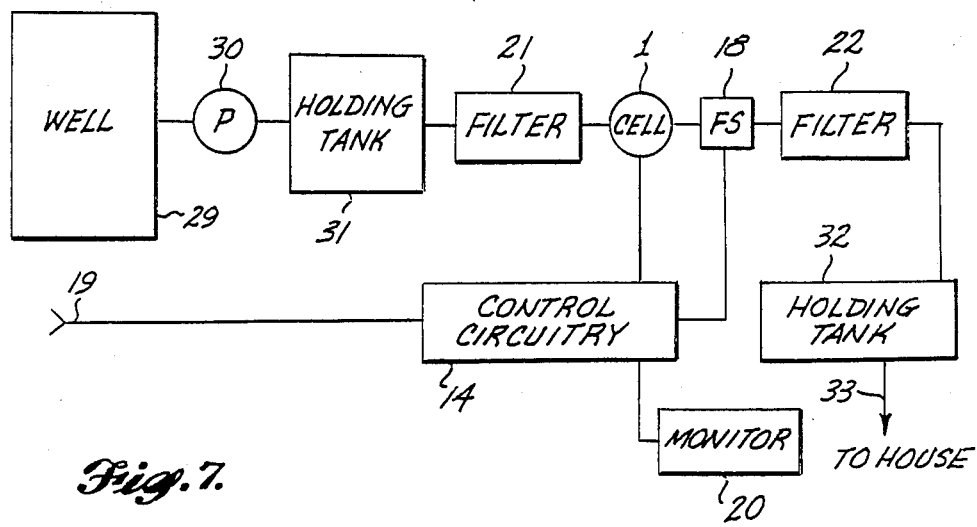
FIG. 7 is a diagram of apparatus used in conjunction with a water supply well system.

While the apparatus shown in FIG. 5 is best adapted for use in connection with a municipal water system, the apparatus shown in FIG. 7 can be utilized in a system supplied with water from a well serving on or two residences as distinguished from a large commercial well. In such an installation water is pumped from the well 29 by a pump 30, which may be of the centrifugal type, to a holding tank 31. Such pump may have a capacity of 30 gallons to 50 gallons per minute and operate intermittently. Water is supplied from the holding tank 31 to the clarifying apparatus at a rate much slower than the rate at which pump 30 fills the holding tank. Such holding tank may be elevated so that water flows from it to the outlet of the clarifying apparatus at a rate of about one gallon per minute.

The clarifying apparatus used in the well system is generally similar to that described in connection with FIG. 5. The filter 21 being of the absorbent paper cartridge type will remove sand from the well water.

While the clarifying apparatus can operate as a demand system like the apparatus of FIG. 5 and FIG. 6, the clarifying process can alternatively be in operation during movement of water from the holding tank 31 to a final holding tank 32 when water is not being withdrawn from the system through the connection 33 to the house plumbing system. For such operation the holding tank 32 may be of the pressurized bladder type in which the holding tank is a bladder housed in a container under air pressure so that when water is flowing into the bladder air is being pressurized in the container and when an outlet faucet of the house plumbing system is opened the air under pressure pressing on the bladder will force water from the holding tank to the opened faucet. When the bladder of holding tank 32 has been filled the back pressure will automatically deenergize the pump or terminate flow of water by gravity into the tank. Such termination of flow will cause the flow switch 18 to deenergize the clarifying cell.

Figure 8:
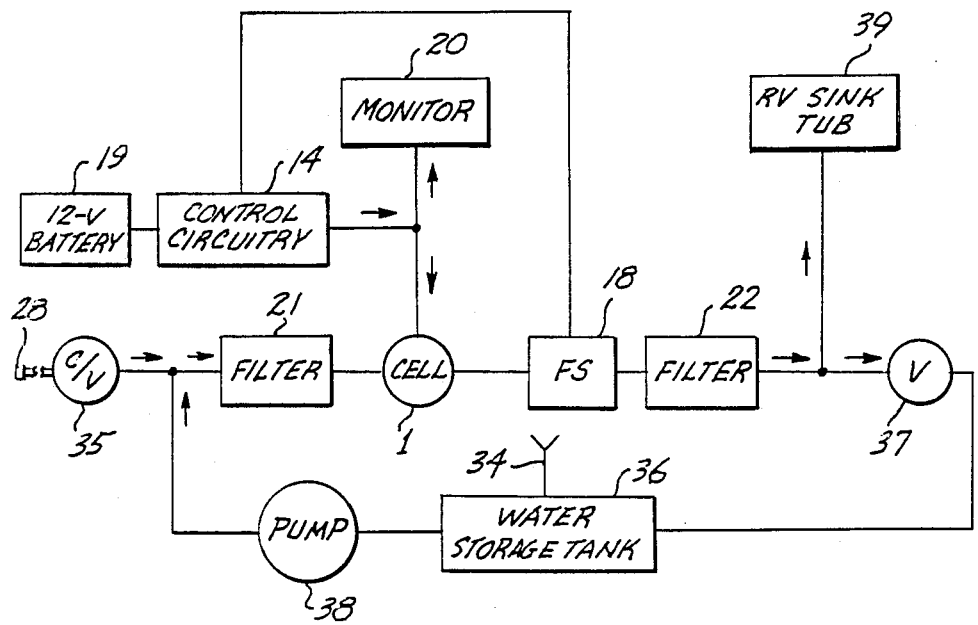
FIG. 8 is a diagram of apparatus to be used in conjunction with the water system of a vehicle such as a house trailer, a recreational vehicle or a cabin cruiser.
Figure 13:
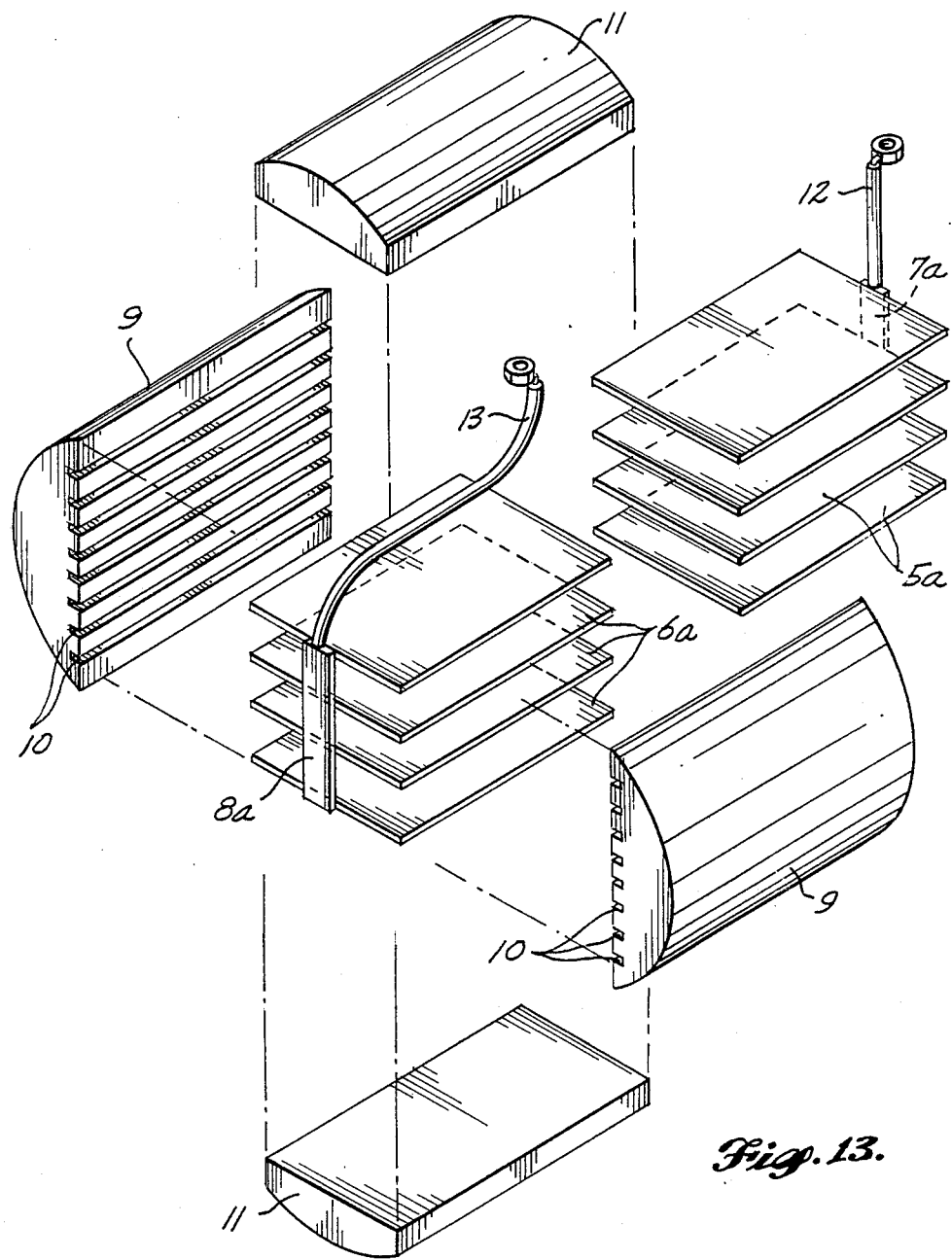
FIG. 13 is a top perspective of internal components of such alternate type of electrolytic cell shown in exploded relationship.

FIG. 8 is a diagram of apparatus used for clarifying water in the water system of a house trailer, a recreational vehicle or a cabin cruiser. Such apparatus includes the same clarifying cell control mechanism, monitor, flow switch and filters as used in the apparatus described in connection with FIG. 5. In this instance, however, the power source will not be rectified alternating current but can be a primary source of direct current electricity such as a 12 volt battery 19'.

As in the apparatus of FIG. 6, water is supplied to the apparatus through a temporary connection 28 which may be a hose coupling. The filling connection for the apparatus has in it a check valve 35 which will permit flow from the connection 28 only into the apparatus. Water from the supply connection will flow through the clarifying apparatus including filter 21, clarifying cell 1 and filter 22, as described in connection with FIG. 5. Water discharged from filter 22 will flow to the water storage tank 36. During such filling operation the manual valve 37 must be in open position.

After the tank-filling operation has been completed the manual valve 37 should be closed. Water for use can be pumped out of the storage tank 36 by the pump 38 and conveyed to the sink or tub 39 by a line connected to the apparatus between the filter 22 and the control valve 37. The pump can be energized by closure of a switch to dispense water or such pump can be controlled automatically by a demand switch actuated when a faucet for the tub or sink 39 is opened.

Although the water in the storage tank preferably has passed through the clarifying apparatus once while the tank is being filled, the water for use is pumped by pump 38 to a sink or tub 39 through a connection to the apparatus between the check valve 35 and the filter 21 so that such water passes again through the filter 21, cell 1 and filter 22 on its way to the sink or tub 39. Alternatively, the tank can be filled directly through a filling connection 36', in which case the water would be treated only once, namely, while being pumped from the tank to the sink or tub. Such a filling operation would expedite filling of the tank but an additional clarifying operation can be performed by filling the tank 36 through the clarifying apparatus as discussed above.

In other installations water can be recirculated through clarifying apparatus repeatedly, such as by treating successive portions of the contents of a swimming pool or a hot tub where water from a swimming pool or a hot tub is recirculated repeatedly through clarifying apparatus it is not necessary that the path of travel of the liquid in contact with the electrolytic cell plates be as long as in the apparatus shown in FIGS. 1 to 4. In the alternative type of clarifying electrolytic cell shown in FIGS. 10, 11, 12 and 13 the anode plates 5a and the cathode plates 6a can be of the same size as the anode plates 5 and the cathode plates 6, shown in FIGS. 1, 2, 3 and 4. In this instance, however, the anode plates 5a project in cantilever fashion from a central connecting strap 7a instead of from a connecting end plate. Similarly the cathode plates 6a project in cantilever fashion from a connecting strap 8a instead of from an end plate 8, thus providing a multiple branch through passage between the plates of the stack. While the anode plates 5a and the cathode plates 6a are interleaved as shown in FIGS. 10, 11 and 12, such plates can be held in properly spaced relationship by their opposite edges being fitted into the grooves 10 of the plate mounting blocks 9 as shown in FIG. 12 and described in connection with FIG. 3. Similarly the space above the upper anode plate 5a and beneath the lower cathode plate 6a can be filled by filler blocks 11, as shown in FIG. 12 and described in connection with FIG. 3.

With the electrolytic clarifier plates 5a and 6a, mounting blocks 9 and filler blocks 11 assembled in the manner indicated in FIGS. 10, 11 and 12, liquid can flow in substantially straight parallel paths between the plates from the inlet 2 to the outlet 3 of the cell with negligible obstruction by the plate connecting strap 7a and 8a. The time of contact of the liquid with the anode plates and the cathode plates in such a through-passage cell would be only approximately one-seventh as long in the apparatus shown in FIGS. 10, 11 and 12 as in the apparatus shown in FIGS. 1, 2 and 3 if the flow velocity were the same because of the sinuosity of the path in the latter case.

Figure 14:
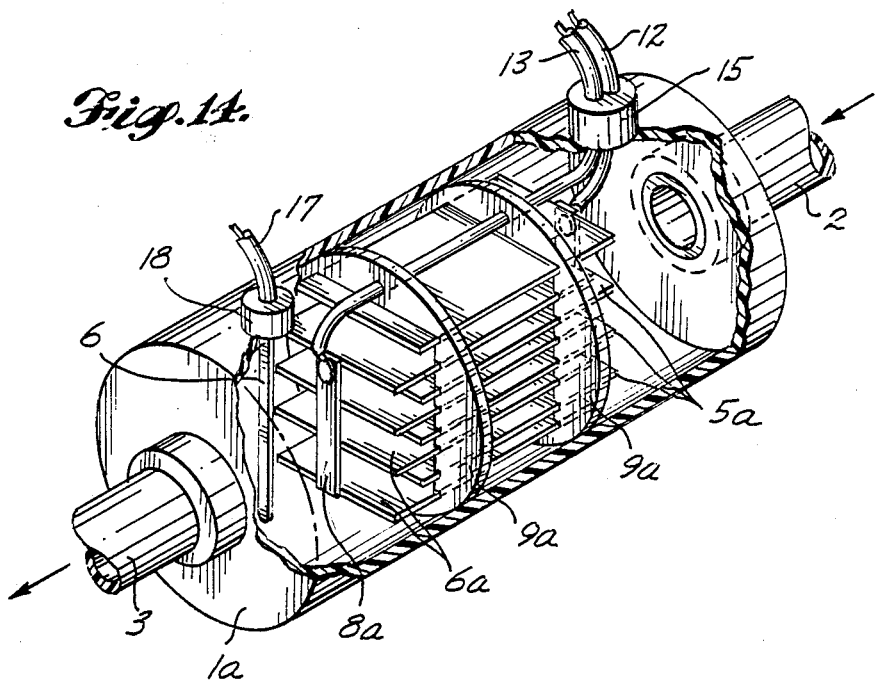
FIG. 14 is a top perspective of a modification of the alternate type of clarifying electrolytic cell with parts broken away.

The arrangement of the anode plates 5a and the cathode plates 6a in the clarifying electrolytic cell shown in FIG. 14 is the same as the plate arrangement shown in the cell of FIGS. 10 to 12 but the structure for supporting the plates in such arrangement is different. In this cell, instead of using mounting blocks and filler blocks to position the cell plates and provide a barrier to flow of liquid through the cell around the plates, the plates extend between and are mounted by two mounting rings 9a spaced apart lengthwise of the cell and preferably located adjacent to opposite ends of the plate stack respectively. Such rings have rectangular apertures opposite sides of which are provided with grooves into which the opposite edge portions of the plates fit to hold the plates. The peripheries of such mounting plates fit snugly against the inner periphery of the cell casing so as to block passage of liquid between such rings and the cell casing. While the spaces at opposite sides of the cell edgewise of the plates between the two spaced mounting rings 9a are in communication with the inner plate spaces, such spaces between the mounting plates provide dead liquid-filled areas which do not interfere with the continual flow of liquid between the plates from the inlet end to the outlet end of the cell.

Multiple-branch through-passage cells of the type shown in FIGS. 10 to 12 and 14 can be used effectively in the representative types of apparatus illustrated in FIGS. 15, 16, 17 and 18.

Figure 15:
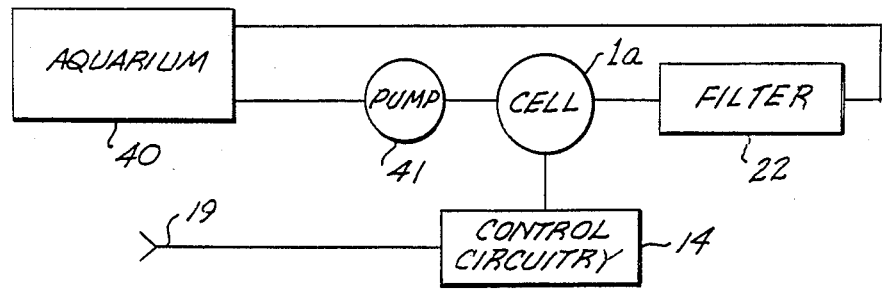
FIG. 15 is a diagram of apparatus utilizing the alternate type of clarifying electrolytic cell in connection with an aquarium.

In FIG. 15 the clarifying electrolytic cell 1a is used for maintaining the liquid in the aquarium 40 in clean condition to obviate the formation of scum on the surface of the water, formation of deposits on the interior wall of the aquarium tank and clouding of the water. Because of the recirculation of water in the aquarium by the pump 41 through the cell 1a, it is not necessary to provide a filter ahead of the cell. The filter 22 beyond the cell will remove from the water material that has been coagulated by the treatment of the water passing through the cell either in free condition or which is sloughed off the plates of the cell when the direction of the current is reversed. As discussed above, the filter 22 is of the activated charcoal type.

Figure 16:
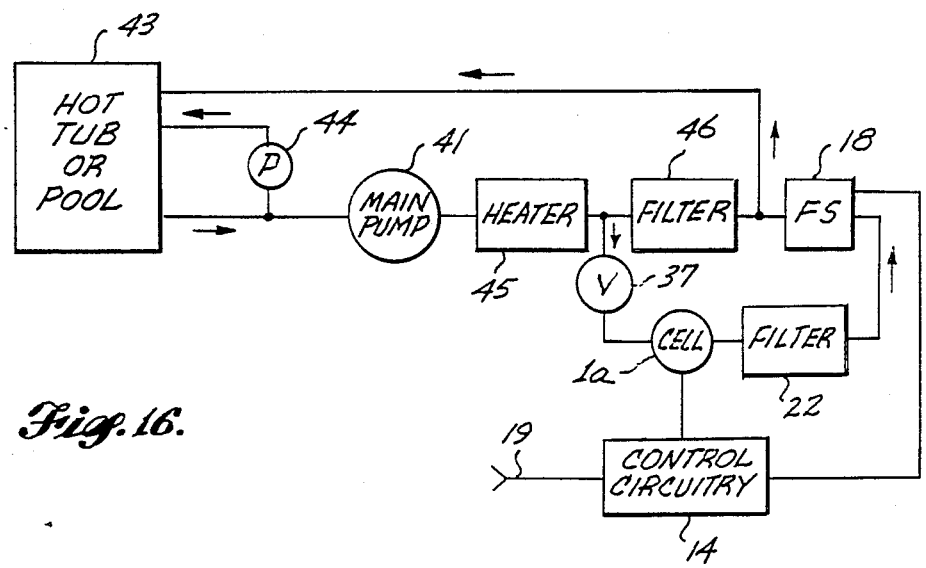
FIG. 16 is a diagram of apparatus utilizing the alternate type of clarifying electrolytic cell in connection with a hot tub or swimming pool.

Another application of the through flow type of clarifying electrolytic cell is illustrated in FIG. 16 in which water in a hot tub or swimming pool 43 is recirculated through the apparatus. In this apparatus, as an auxiliary feature, a local water recirculating duct may have in it a jet pump 44 withdrawing water from the lower portion of the hot tub or pool and injecting it into the hot tub or pool at a higher elevation to agitate the water for massaging or mixing purposes.

The clarifying apparatus includes a pump 41 withdrawing liquid from one portion of the pool and forcing such liquid through a recirculating path including a heater 45 to maintain the temperature of the water in the hot tub or pool at a desired level. Beyond the heater 45 the recirculation path branches, one portion of such path being through a conventional filter 46 which may be of the diatomaceous earth type. From the discharge end of such filter water may return to the hot tub or pool. Such a recirculation circuit is conventional. The filter 46, however, will not remove from the water finely divided impurities or chemical impurities such as chlorine or metals. To remove such residual impurities a portion of the recirculated water passes through a bypass branch around filter 46 which includes the clarifying electrolytic cell 1a of the through-flow type followed by a filter 22 of the paper type. The amount of water flowing through such bypass can be regulated by a manual control valve 37.

Figure 17:
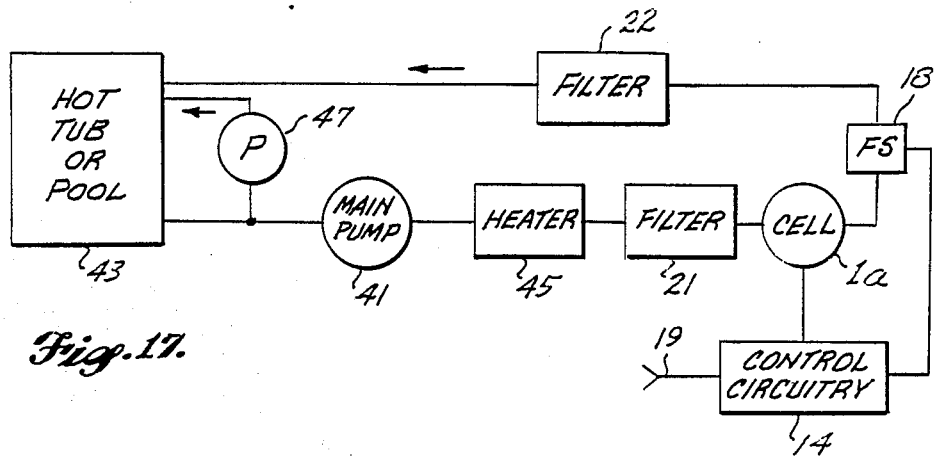
FIG. 17 is a diagram of an alternate type of apparatus utilizing a clarifying electrolytic cell in conjunction with a hot tub or swimming pool.

In the apparatus illustrated in FIG. 17, the entire amount of water recirculated with respect to the hot tub or swimming pool 43 is clarified by the apparatus of the present invention except for the water recirculated by the jet pump 44 for agitation or mixing purposes. In this case the absorbent paper cartridge filter 21, the through-flow type of clarifying electrolytic cell 1a, the flow switch 18 and a second paper cartridge filter 22 are all arranged in series with the main pump 41 and heater 45.

Figure 18:
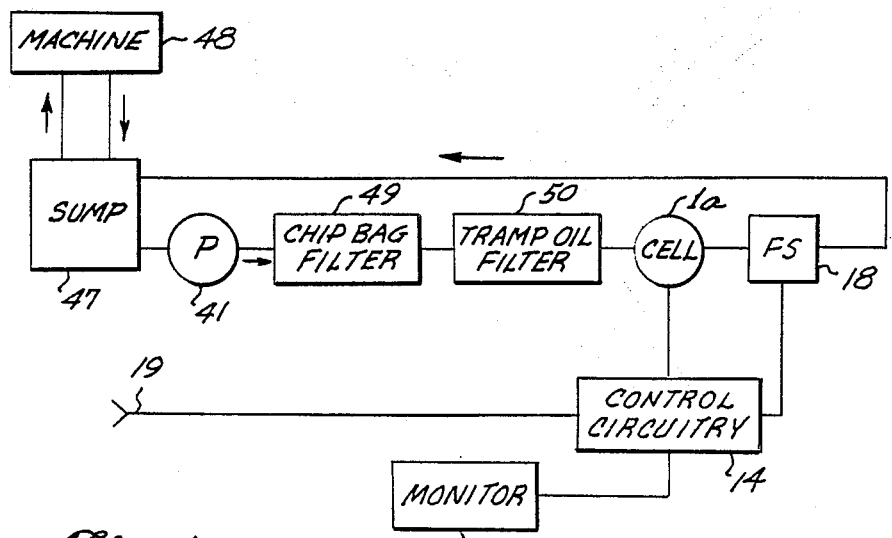
FIG. 18 is a diagram of apparatus utilizing a clarifying electrolytic cell for clarifying cutting fluid.

The apparatus shown in FIG. 18 is used for clarifying soluble oil for reuse in a machining operation as cutting oil or cooling oil. In this apparatus the soluble oil is pumped for use from a sump 47 to a machine 48, such as a drill press or milling machine, for example, and returned to the sump. Such return oil may contain metallic chips, lubricating oil, dirt and perhaps biological impurities. It is desirable to clean the soluble oil continuously for ruse. Such cleaning operation is effected by recirculating a portion of the oil continuously from the sump through clarifying apparatus. Such clarifying apparatus includes the pump 41 pumping liquid from the sump 47 into a chip bag filter 49 to filter out chips of appreciable size, although minute chips may pass through it.

The soluble oil next passes through a tramp oil filter 50 which separates lubricating oil that rises to the surface of the soluble oil emulsion. The soluble oil emulsion then passes through the through-flow clarifying cell 1a and returns to the sump.

The control circuitry 14 used to control the clarifying cell 1a in the soluble oil reconditioning apparatus may be the same as or similar to that used for the clarifying apparatus shown in FIGS. 16 and 17. Because the operation of the clarifying apparatus will be continuous, the inclusion of a flow-sensitive switch 18 might be considered to be unnecessary. Actually, however, it is desirable to include such a flow-sensitive switch in the apparatus because, if the flow through the apparatus should be excessively impeded, such as by the chip bag filter 49 becoming filled and clogging flow of liquid through the clarifying apparatus, the supply of electricity from the control circuitry 14 to the cell 1a will be cut off and the red warning light of the monitor 20 will be illuminated to notify the operator of trouble in the recirculating operation.

The result of utilizing the clarifying apparatus for clarifying soluble oil is that microbes will be killed and malodor will be avoided so that such oil may be reused for a period of as much as a year instead of being replaced in approximately one month, as is customary.

FIG. 9 shows a diagram for the control circuitry of the sinuous flow cell 1 shown in the apparatus of FIGS. 5, 6, 7 and 8, and FIG. 19 shows a diagram for the control circuitry for the through-flow cell 1a of the apparatus illustrated in FIGS. 15, 16, 17 and 18. The control mechanism for the two types of cells is similar, both requiring the impression of direct current on the cell plates. In both instances, it is preferred that, where possible, the electricity be supplied from a conventional alternating current source 19, such as 110 volt or 220 volt transformed to a low voltage, such as 12 volts or 24 volts, depending on the particular type of installation for which the clarifier is to be used. The higher voltage is preferable for apparatus including larger capacity cells so as to enable the current of the electricity supplied to the cell plates to be lower for a given power utilization.

Figure 19:
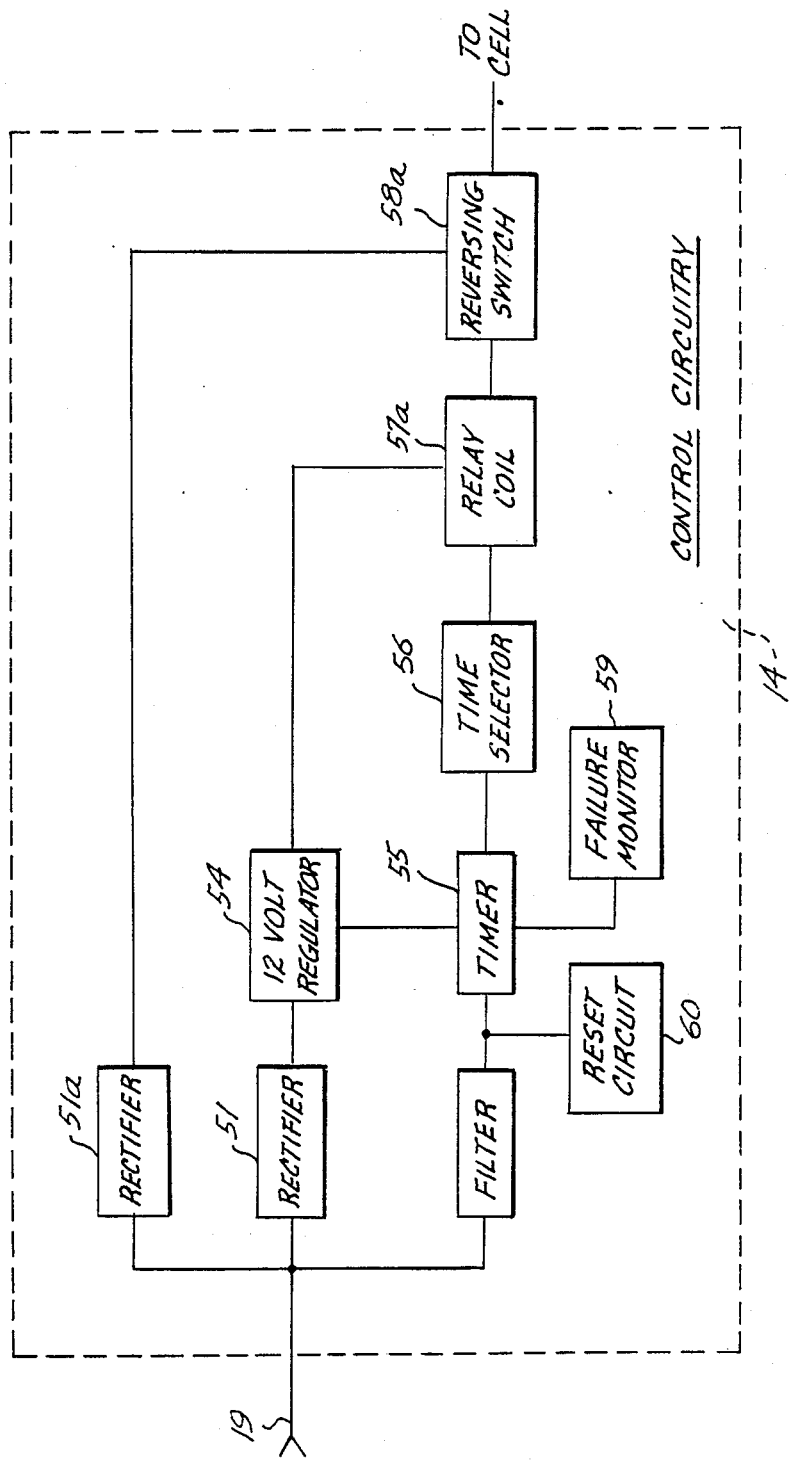
FIG. 19 is a detailed circuit diagram of control and timing mechanism for use with a clarifying electrolytic cell of the type shown in FIGS. 10, 11, 12 and 13.

The circuitry for the serpentine flow cell 1, shown in FIG. 9, and for the through-flow cell 1(a) shown in FIG. 19, are similar. To provide the direct current for the cells a rectifier 51 is provided in circuit with the alternating current supply 19 of 110 or 220 volts. In the circuitry of FIG. 9, the rectifier provides a 12-volt current stabilized by the phase control 52, voltage/current control 53 and 12-volt regulator 54. Such direct current supply is connected to timer 55, time selector 56 and drive control 57, which controls the silicon controlled rectifier (SCR) drivers 58. The time selector is of the tap or rheostat type.

The cell plates 5 and 6 are powered from the external SCR circuit of FIG. 9 and current will flow between them in one direction for the period of time for which the timer 55 is set by the time selector 56. In most circumstances the time for flow of the current in one direction can be from 10 to 30 hours depending upon the rate of liquid flow through the cell and the purity of the liquid, after which the current direction between the plates can be reversed for a period of 15 to 60 minutes to purge the cell plates of impurities removed from the water and adhering to them. It is preferred that the current flow be in one direction for a period of time much longer than the reverse flow of current in the opposite direction so as to maintain the anode and cathode identity of the plates.

In the event that the accumulation of impurities on the plates should be greater than desirable, the cell failure monitor 59 is energized to alert the operator that current has been flowing in one direction through the cell for an undesirably long period of time. Such failure monitor could be a light and/or an audible signal. The time selector 56 can be adjusted to reduce the time during which current flows in one direction through the cell.

The red, green and yellow lights of the monitor 20 will indicate generally whether the cell is operating properly. When the flow switch 18 is in open condition, indicating that there is no flow through the cell, none of the lights of the monitor will be illuminated.

In the circuitry of FIGS. 19 used for powering the through-flow cell 1A, the power source 19 is connected to two rectifiers. The reason for this difference over the circuitry of FIG. 9 is that reversal of the direction of current flow through the through-passage cell is accomplished by a relay-controlled reversing switch instead of by solid state switching provided by silicon-controlled rectifiers.

In the circuitry of FIG. 19, the rectifier 51 and regulator 54 again provide a 12-volt current source to power the timer 55 and time selector 56. The timer and time selector control powering of relay coil 57a which controls the polarity of reversing switch 58a. Power for the cell 1a is supplied to the reversing switch 58a by rectifier 51a having a 24-volt voltage.

The operation of the circuitry shown in FIG. 19 is comparable to that described in connection with FIG. 9, except that the time control circuit powers the relay coil 57a instead of the drive control 57 for the SCR drivers. The preferred timing for the cell 1a will be similar to that for the cell 1 described in connection with FIG. 9. The reversing switch will function like the SCR drivers to reverse the direction of current flow between the plates 5a and 6a of the cell 1a under the control of the timer. A reset circuit 60 may be provided that can be actuated to reactivate the cell operation at will.

I claim:

1. Liquid clarification apparatus comprising an electrolytic cell including two sets of plates of inert electrically conductive material grouped in interleaved closely-spaced relationship, housing means for said plates having an inlet at one side of said plates and an outlet at the other side of said plates for flow of liquid containing impurities between said plates from said inlet to said outlet, direct electric current supply means having one lead electrically connected to the plates of one of said sets and the other lead electrically connected to the plates of the other of said sets for energizing said cell for a period of time sufficient for such current flow to effect deposit of impurities from the liquid flowing through said electrolytic cell onto said plates, current reversing means connected in said electric current supply means for periodically reversing the direction of current flow between said plates of said two sets for a period of time sufficient to purge material accumulated on plates of said cell, a filter in the outlet from said cell for trapping material sloughed from said plates during such period of current reversal and carried by the liquid discharged from said cell during such period of current reversal, a probe projecting from said housing means into the path of flow of liquid between the inlet and the outlet through the spaces between the plates of the cell of a size which will not appreciably reduce the passage for flow of liquid through the cell, and a normally open switch in circuit with the electric current supply means for actuation by deflection of said probe to energize the electric current supply means.

2. Liquid clarification apparatus comprising an electrolytic cell including two sets of plates of inert electrically conductive material grouped in interleaved closely-spaced relationship, housing means for said plates having an inlet at one side of said plates and an outlet at the other side of said plates for flow of liquid containing impurities between said plates from said inlet to said outlet, direct electric current supply means having one lead electrically connected to the plates of one of said sets and the other lead electrically connected to the plates of the other of said sets for energizing said cell for a period of time sufficient for such current flow to effect deposit of impurities from the liquid flowing through said electrolytic cell onto said plates, current reversing means connected in said electric current supply means for periodically reversing the direction of current flow between said plates of said two sets for a period of time sufficient to purge material accumulated on plates of said cell, and a charcoal type filter in the outlet from said cell for trapping material sloughed from the plates during such period of current reversal and carried by the liquid discharged from said cell during such period of current reversal.

3. A process for clarifying liquid which comprises arranging two sets of plates of inert electrically conductive material in interleaved closely-spaced relationship to form an electrolytic cell, flowing liquid containing impurities between the plates of the cell, passing direct current electricity from the plates of one set to the plates of the other set for a period of time sufficient to effect deposit on the plate surfaces a substantial amount of impurities attracted to such plate surfaces, periodically reversing the direction of direct current flow between the plates for a period of time sufficient to purge from plate surfaces impurities adhering thereto, trapping in a filter impurities sloughed from the plate surfaces and carried by liquid discharged from the electrolytic cell, and terminating the flow of electricity between the plates of the cell if the velocity of the flow of liquid through the cell decreases below a predetermined value.

4. A liquid clarification apparatus comprising two sets of plates of inert electrically conductive material grouped in interleaved closely-spaced relationship to form an electrolytic cell through which liquid containing impurities may flow, electric current supply means for passing direct current electricity from the plates of one set to the plates of the other set for a period of time to effect deposit on the plate surfaces of impurities attracted to such plate surfaces, means for reversing the direction of direct current flow between the plates to purge from plate surfaces impurities adhering thereto, a filter for trapping impurities sloughed from the plate surfaces and carried by liquid discharged from the electrolytic cell, and means for terminating the flow of electricity between the plates of the cell if the velocity of the flow of liquid through the cell decreases below a predetermined value.

* * * * *